(12) United States Patent
German

(10) Patent No.: US 8,218,164 B2
(45) Date of Patent: Jul. 10, 2012

(54) VARIABLE FAULT TOLERANCE METHODS AND SYSTEMS TO SUPPORT AN INTERVENTION-BY-CHOICE STRATEGY FOR PRODUCTION PIEZO INK JET ARCHITECTURES

(75) Inventor: Kristine A. German, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1260 days.

(21) Appl. No.: 11/945,595

(22) Filed: Nov. 27, 2007

(65) Prior Publication Data

US 2009/0138765 A1    May 28, 2009

(51) Int. Cl.
G06K 15/00 (2006.01)
G06F 3/12 (2006.01)
G06F 17/00 (2006.01)
B41J 29/393 (2006.01)

(52) U.S. Cl. ............ 358/1.14; 358/1.15; 358/1.13; 347/19; 715/274

(58) Field of Classification Search ............ 358/1.14, 358/1.15; 347/19; 715/274
See application file for complete search history.

(56) References Cited

U.S. PATENT DOCUMENTS

| | | | |
|---|---|---|---|
| 5,559,606 A | 9/1996 | Webster et al. | |
| 6,238,112 B1 * | 5/2001 | Girones et al. | 400/74 |
| 6,412,902 B2 * | 7/2002 | Matsumoto et al. | 347/19 |
| 6,471,314 B2 * | 10/2002 | Doi | 347/5 |
| 6,533,384 B1 * | 3/2003 | Vega et al. | 347/19 |
| 6,547,365 B1 * | 4/2003 | Alberto et al. | 347/19 |
| 2001/0052913 A1 * | 12/2001 | Matsumoto et al. | 347/19 |
| 2002/0163570 A1 * | 11/2002 | Phillips | 347/224 |
| 2002/0171864 A1 * | 11/2002 | Sesek | 358/1.15 |
| 2002/0196304 A1 * | 12/2002 | Gomez et al. | 347/23 |
| 2003/0076525 A1 * | 4/2003 | Hikawa | 358/1.14 |
| 2003/0081035 A1 * | 5/2003 | Van Veen | 347/19 |
| 2003/0090696 A1 * | 5/2003 | Willis et al. | 358/1.14 |
| 2003/0202200 A1 * | 10/2003 | Terrill et al. | 358/1.14 |
| 2004/0100649 A1 * | 5/2004 | Johnson et al. | 358/1.14 |
| 2005/0030327 A1 * | 2/2005 | Tatsumi | 347/13 |
| 2005/0162681 A1 * | 7/2005 | Ng et al. | 358/1.14 |
| 2006/0012806 A1 * | 1/2006 | Subirada et al. | 358/1.8 |
| 2006/0126099 A1 * | 6/2006 | Nakagawa | 358/1.14 |
| 2006/0268317 A1 | 11/2006 | Lofthus et al. | |
| 2006/0268318 A1 | 11/2006 | Lofthus et al. | |
| 2007/0046995 A1 * | 3/2007 | Toda | 358/1.16 |
| 2007/0201066 A1 * | 8/2007 | Ziv | 358/1.9 |
| 2007/0237529 A1 * | 10/2007 | Katou | 399/9 |
| 2008/0013848 A1 * | 1/2008 | Wu et al. | 382/254 |
| 2008/0126860 A1 | 5/2008 | Sampath et al. | |
| 2008/0225072 A1 * | 9/2008 | Klees et al. | 347/19 |

* cited by examiner

Primary Examiner — King Poon
Assistant Examiner — Vincent Peren
(74) Attorney, Agent, or Firm — Fay Sharpe LLP

(57) ABSTRACT

Methods and systems are provided for an intervention-by-choice printhead maintenance method in an ink jet printing system. Profile representations of scheduled print jobs are compiled which are representative of ink jet performance demand therefor. An ink jet failure is detected and related to the profile representations. A likely impact of ink jet failure is assessed relative to job specific print quality requirements for the scheduled print jobs. Print jobs are rescheduled for enhancing system performance efficiency by re-queuing selected jobs that can be executed with a detected ink jet failure while satisfying a job specific print quality requirement before a system repair intervention.

15 Claims, 4 Drawing Sheets

VARIABLE FAULT TOLERANCE METHODS AND SYSTEMS TO SUPPORT AN INTERVENTION-BY-CHOICE STRATEGY FOR PRODUCTION PIEZO INK JET ARCHITECTURES

BACKGROUND

The presently disclosed embodiments relate to ink jet architectures for high speed production printing, and more particularly, production piezo ink jet (PIJ) architectures employing a large array of printheads in a direct to web architecture; however, the embodiments also apply to other modular jet architectures producing print by employing a large array of printheads.

A piezo ink jet printhead will expel a volume of ink upon an ink chamber contraction resulting from an applied voltage. Normally the ink has to be heated to a comparatively high temperature because the ink will be solid at room temperature. In a production printing embodiment, 20 or more printheads are configured in an array with each printhead having several hundred jets. Because all jets must be working at the same time, reliability requirements for the printheads are compounded. In other words, the need to mitigate disruptions associated with jet failures is critically important in any production printing embodiment that employs large numbers of non-redundant jets.

Printheads experience a jet failure whenever any of their jets are either not jetting enough ink or not jetting any ink at all. Some jet failures are intermittent, which means the corresponding jets either spontaneously recover, or are recovered by a maintenance procedure. Other jet failures are chronic, which means the function of the corresponding jets cannot be recovered. When a jet fails, it is not known if the failure is chronic until several attempts to recover the jet have failed. The process for attempting to recover failed jets is a fairly involved. A relatively large volume of ink is forced through the head in an effort to purge whatever is blocking the failing jet. The face of the printhead is cleaned with an automatic wiper to remove excess ink. One can imagine that for a large roll of paper comprising a production web, if a jet recovery operation had to occur every time any one of the substantial number of printheads failed, then the purge operation would be very disruptive to the extent that no reasonable commercial operation could result. Nevertheless, jet failures have to be dealt with, and in a typical production environment, operators may frequently be faced with an uncomfortable trade-off between choosing the direct cost of changing one or more printheads versus dealing with the potentially time consuming disruption of performing printhead purge and maintenance cycles, and the additional trouble shooting procedures in the printer to recover one or more printheads. When a failing printhead has to be "swapped" with a replacement head, a "cold swap" is performed so that the system cannot return to a production ready state until the replacement unit and the delivery ink are heated to a print-ready production status. Post production sorting and recovery of jobs and pages with image defects is also problematic.

One option for meeting customer requirements with production ink jet architectures is to target only the portion of the market that has high tolerance for jetting faults, in other words, has consistently low print quality requirements. Fortunately, acceptable print quality is not a strict function of perfect jet performance, but rather also depends on the combination of: (1) specific print images within a job, (2) location and degree of jet failures, and (3) job specific customer print quality requirements. What is needed is a set of methods to support a business friendly strategy for practicing intervention-by-choice printhead maintenance that can help operators to comprehend how the print system's present jet performance is likely to impact specific jobs, and then re-optimize scheduling of print jobs and maintenance interventions accordingly.

Enabling elements for these methods could include: jet performance monitoring, automatic or manual print job image characterization, job quality requirement tagging, simulated defect previewing, job re-queuing, web changeover tracking, operator alerts, and a well featured GUI. With these elements properly employed, the system could assume a variable degree of fault tolerance that is compatible with job-to-job dependent customer needs. Not all such elements would be required though to better align job queuing and intervention timing with customer business value. The degree of automation and sophistication could also be variable. For example, a system with 20 partial width heads, each with 1000 jets nominally requires all 20,000 jets to work on demand at all time but many jobs can be printed with one or more weak or missing jets. Customers do not want a system to shut down and be prompted for immediate maintenance when the printer is producing acceptable output.

There is a need for a system that minimizes the impact of jetting errors on the print shop workflow and facilitates an intervention strategy that can adapt system operating capabilities with specific job demands.

SUMMARY

According to the aspects illustrated herein, there is provided a method for scheduling print jobs and printed maintenance in an ink jet printing system in response to printhead ink jet failure. The method comprises determining a schedule of job profiles that includes representing printhead spatial demand per color per jet per job; identifying an ink jet failure and a position thereof relative to a printhead; communicating to an operator a relationship between the printhead spatial demand and the ink jet failure for a scheduled print job; identifying an unacceptable job print quality from the relationship; and, rescheduling the nominally unacceptable print job for a time when corrective maintenance has been accomplished for the ink jet failure.

The rescheduling includes changing the order of print jobs to execute selected print jobs having communicated relationships of acceptable job print quality prior to the corrective maintenance and delaying other print jobs having communicated relationships of unacceptable job print quality until after the corrective maintenance.

The communicating may include displaying a graphical representation of currently scheduled job demands and ink jet profiles to a human operator.

Another disclosed feature of the embodiments comprises an intervention-by-choice printhead maintenance method in an ink jet printing system. A system comprises compiling profile representations of scheduled print jobs representative of ink jet performance demand therefor. An ink jet failure is detected. The ink jet failure is related to the profile representation. A likely impact of ink jet failure to job specific print quality requirements for the scheduled print jobs is assessed. The print jobs are rescheduled for enhancing system performance efficiency by re-queuing selected jobs which can be executed with the detected ink jet failure while satisfying the job specific print quality requirement before a system repair intervention.

The assessing includes considering one or more enabling elements comprising:

sheet and/or job scheduling based on a model of the machine;

jet performance monitoring;

web usage tracking;

job image characterization (automatic or manual print);

job quality requirement constraints;

error messages and operator alerts;

simulated effect previewing;

a graphical user interface (GUI) to facilitate intervention by choice decisions;

job re-queuing for exception handling; or automated or semi-automated job queuing optimization.

Another disclosed feature of the embodiments comprises an ink jet printing system including variable fault tolerance to support intervention-by-choice job scheduling and maintenance intervention. The system comprises a modular printhead assembly disposed within the printing system for on-line printing operation. A sensor assembly detects ink jet failures within the printhead assembly. A scheduler compiles a print job queue and corresponding job profiles including a representation of printhead spatial demand per color per job. An interface communicates a relationship between the representation and detected ink jet failures. A reschedule reorganizes a job queue when the relationship corresponds to a scheduled job having an unacceptable job print quality wherein the scheduled job is delayed until after completion of the maintenance intervention.

DETAILED DESCRIPTION

Acceptable print quality is not a strict function of perfect jet performance, but rather also depends on the combination of: (1) specific print images within a job, (2) location and characterization of failed jet(s), and (3) job specific customer requirements. For example, many jobs printing on a machine with weak or missing jet may actually be free of defects, such as when a failed jet is in the margin portion of the page, or in a color separation not being used for the job. Moreover, many jet induced defects are invisible or acceptable. The subject embodiments relate to a set of methods and systems to support a customer business friendly intervention-by-choice strategy for printhead maintenance so that the operators are provided information to help them match the capability of the machine after it starts to lose jets with demands of scheduled jobs, i.e., the image requirements of the jobs in the queue. Accordingly, the operator can choose to reschedule the queue to execute jobs that are represented to meet or exceed acceptable job print quality, and delay those jobs not meeting acceptable job quality until a later opportune time after intervention maintenance has been performed on the system. Such an opportune time is typically when the paper web rolls are being changed.

With reference to the Figures wherein the illustrated embodiments are presented for purposes of illustration and not limitation to the specific embodiments shown therein, a method and apparatus are provided which employs an interface unit in an ink jet printing system to communicate to an operator a relationship between print system capability with respect to failed jets and a scheduled jobs demand of ink jets required to execute the job for an acceptable print quality.

Figure 1:
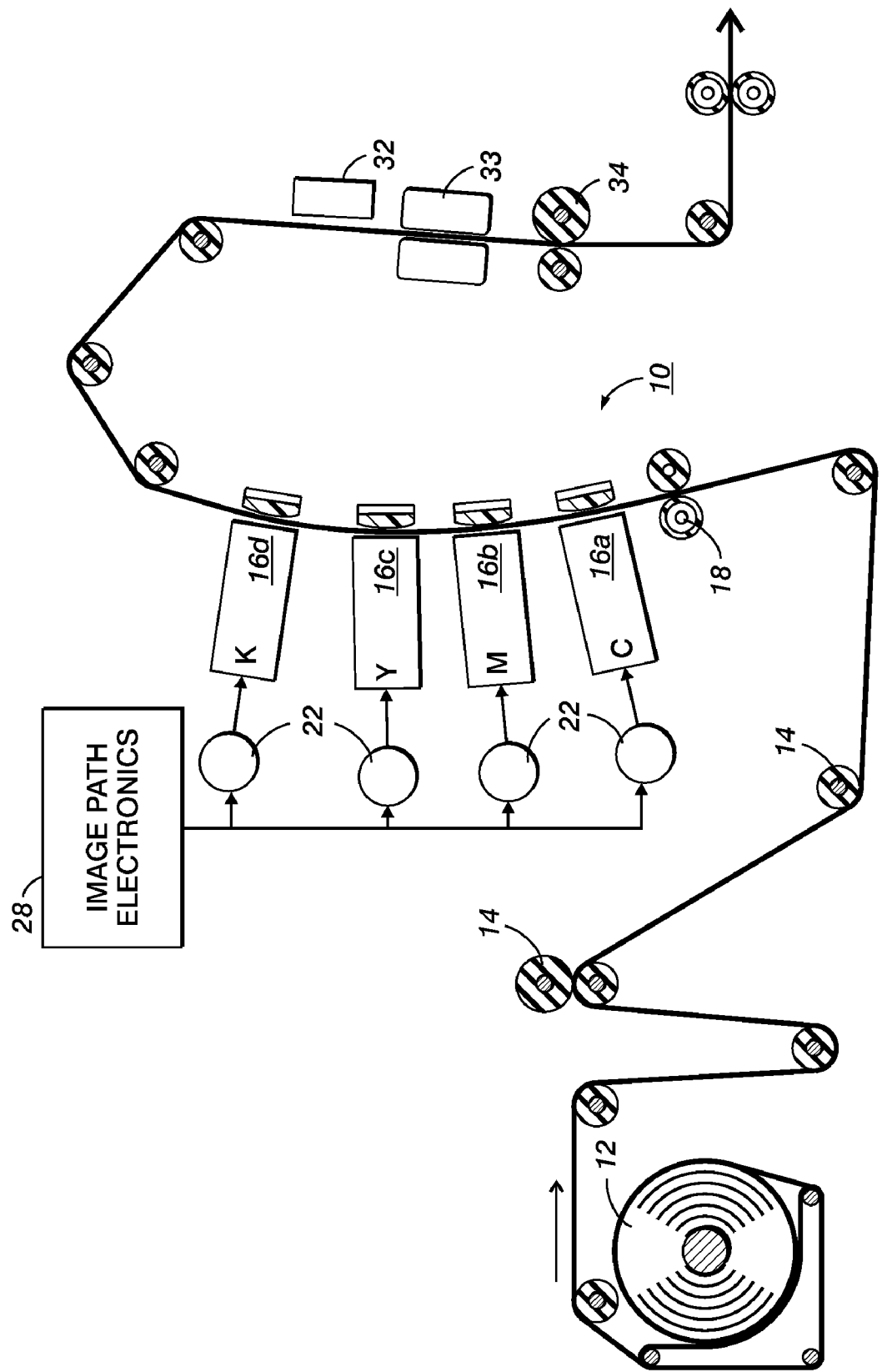
FIG. 1 comprises a schematic assembly drawing of an ink jet printing system; including a plurality of printheads.

With particular reference to FIG. 1, a schematic representation of an ink jet architecture 10 applicable for high speed production printing using piezo ink jet printheads includes a large roll of paper 12, i.e. the web, which is unwound and directed by a web handling system employing a plurality of rollers 14 into a print stations 16a, 16b, 16c, 16d where the ink is jetted onto the web. The print stations 16, each include a plurality of printheads which can be a single color or mixed colors in a variety of arrangements. The printheads are modular in the assembly in that they can be selectively removed from an on-line location within the system and replaced or moved to another print station location therein. An ink reservoir (not shown) supplies the heated ink in a liquid form to the printheads which similarly must maintain the ink in a liquid state before firing. The printhead firing control 22 is executed by an image path controller 28, and selectively supplies the charges to activate the piezos and impart the desired ink jets on to the web. After ink is jetted on to the web, an image-on-web sensor 32 is disposed to assess which jets are or are not fully functional. The jetting assessment may be done continuously or on test patterns printed in between print job images. Next the ink image is reheated on the web by the midheaters 33 in preparation for a final image gloss and spread unit 34. The printed web is then communicated for further handling in finishing stations (not shown).

Figure 2:
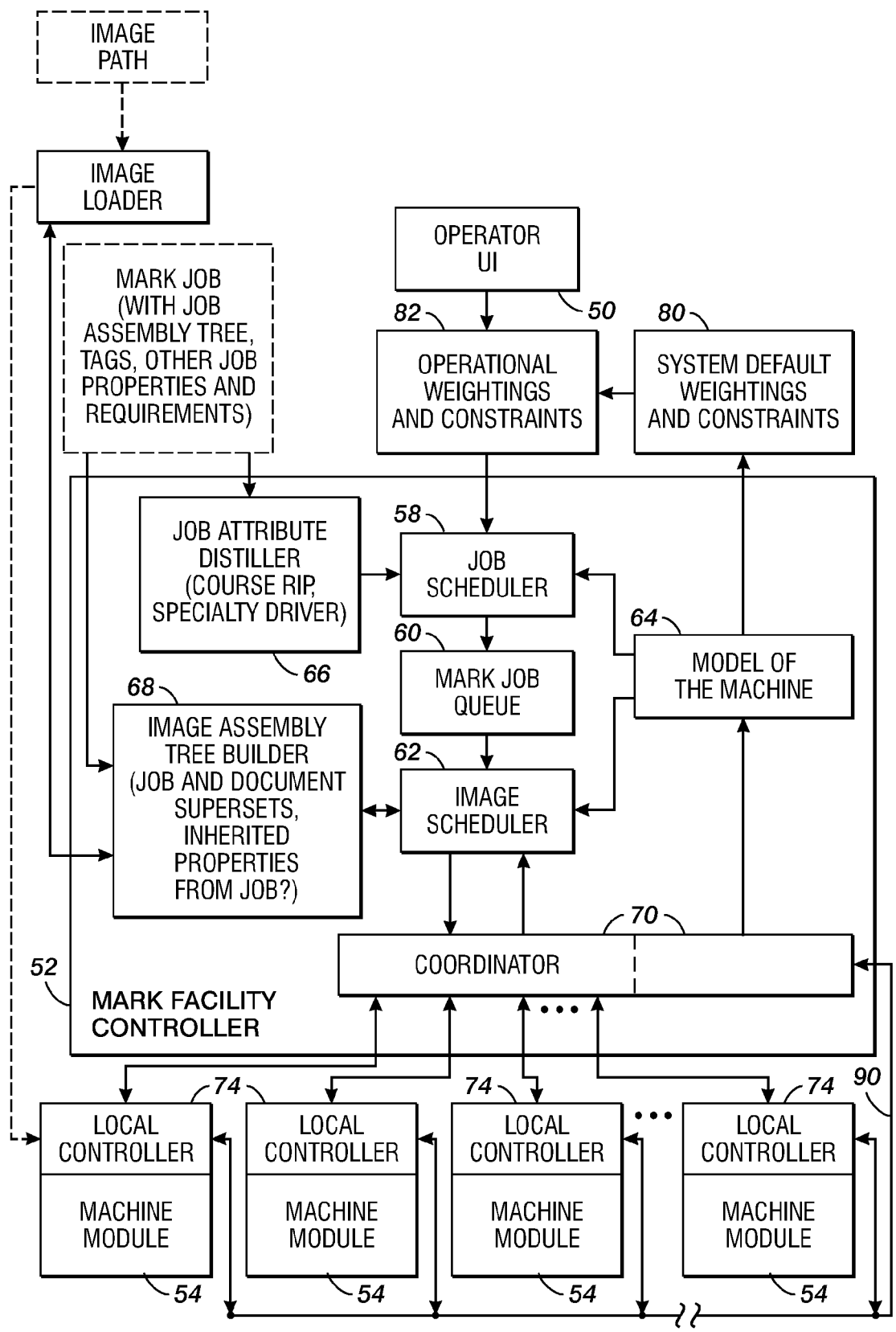
FIG. 2 is a diagrammatic schematic drawing representing scheduling capabilities for a variable fault tolerance method in a production PIJ architecture.

FIG. 2 is a schematic diagram representing scheduling capabilities in an exemplary PIJ architecture. A plurality of printhead machine modules 54 are controlled by mark facility controller 52 to impart desired image patterns on a substrate such as a sheet or web roll (not shown). An operator user interface 50 communicates relevant system operating information to a human operator including representations of detected ink jet failures within the printheads relative to a scheduled print job as hereinafter will be more fully explained.

The mark facility controller 52 includes a job scheduler 58, a job queue 60 comprising a listing of scheduled jobs and image scheduler 62 that lists a proposed image itinerary. Other elements within the mark facility controller 52 comprise an operating model of the machine (a piezo ink jet printing system) 64, a job attribute distiller which communicates a job assembly tree, tags and other job properties requirements to the job scheduler and an image assembly tree builder 68 which communicates to the image scheduler 62 other job sheet properties and requirements. A coordinator 70 coordinates the job data provided by the mark facility controller to the plurality of machine modules through associated local controllers 74 which effectively control various machine modules 54. Relevant local 74 controllers and associated machine modules 54 for the subject embodiments include the print stations 16 for marking the web; the web handling system for controlling the web; and the image-on-web sensor 32 for detecting ink jetted onto the web. A jetting performance monitor function is achieved using the image on web sensor local controller 74, along with its associated machine module 54 working in conjunction with the coordinator 70, which also holds information regarding images printed by the print stations (for example a test image) and where the images are located on the web.

Other items shown in FIG. 2 include system default weightings and constraint data 80 which is inputted to the operational weightings and constraint settings 82, i.e., operator preferences and operational constraints. The system default weightings and constraints are machine module capabilities and states as represented in the model of the machine 62.

An aspect of the local controller 74 is that machine module capabilities, printer information, latitude constraints, as well as a tracking of the module state and history within the module are detected and communicated via communication path 90 through the coordinator 70 to the model of the machine 64 so that relevant information supporting an intervention-by-choice strategy of the operator may be further communicated to the operator through the user interface 50.

Acceptable print quality for a particular job depends on a combination of: (1) specific print images within a job, (2) location and characterization of failed jet(s) and (3) job specific customer requirements. The subject embodiments comprise a method to help operators comprehend how the print systems present jet performance is likely to impact specific proposed jobs, and then re-optimize scheduling the print jobs and interventions accordingly. Consideration of the selective enabling elements of system performance include:

1. sheet and/or job scheduling based on a model of the machine
2. jet performance monitoring
3. web usage tracking
4. job image characterization (automatic or manual print)
5. job quality requirement constraints
6. error messages and operator alerts
7. simulated defect previewing
8. A GUI to facilitate intervention by choice decisions
9. job re-queuing for exception handling
10. automated or semi-automated job queuing optimization With these elements properly employed, the system can assume a variable degree of fault tolerance that is compatible with customer needs. Not all elements are required to better align the choice to intervene with customer business value. The degree of automation and sophistication is also variable. Consideration may include only a portion of the listed elements, or others not listed herein, as the present listing is merely exemplary and other information could be useful in assessing system performance.

Figure 3:
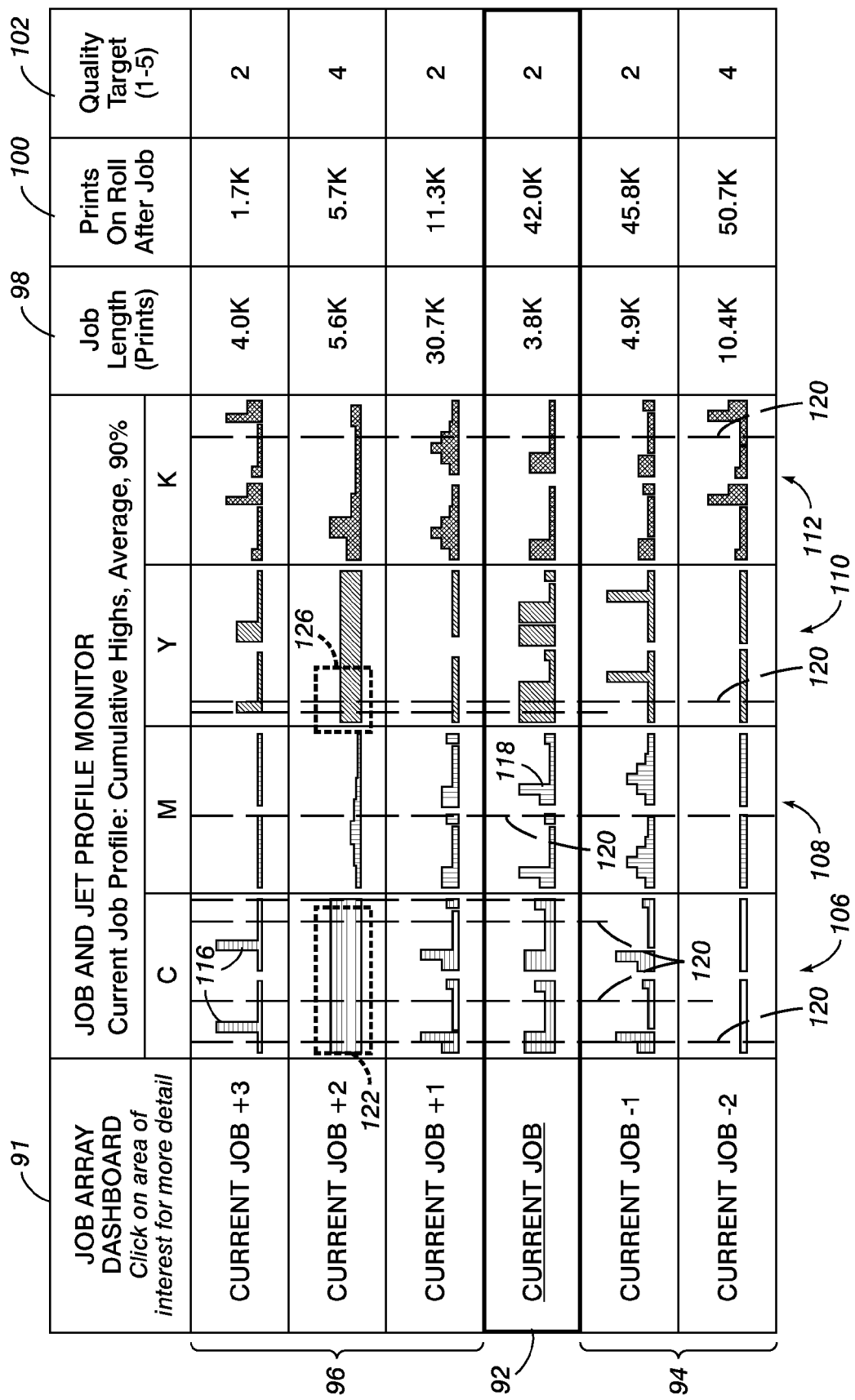
FIG. 3 is a representation of a jet array dashboard functioning as a user interface for illustrating job and jet profiles to monitor information to support an intervention-by-choice decision in the subject variable fault tolerance method.

A more detailed explanation of the foregoing listed elements follows:

1. Sheet scheduling based on a model of the machine is implemented in the mark facility controller 52. The job scheduling for both images and jobs is scheduled well in advance of the actual printing based on a model of the machine.
2. The jet performance monitor helps define the jetting capability encoded in the model of the machine 64 where the image on web sensor machine module 54 and associated local controller 74 is capable of finding printhead alignment errors and malfunctioning jets (weak or missing) in a ink jet printer by measuring the ejected ink droplets on the web before they are reheated and spread for final gloss and appearance.
3. Web usage tracking or more explicitly, the amount of web left before the roll needs to be changed is easily monitored, and for the present embodiments is executed in the web handling control system which also feeds into the model of the machine. A typical web supplies paper for about 50-60 thousand prints. Web changeovers are generally an opportune time to perform head maintenance procedures.
4. Print job image characterization is associated with the job attribute distiller 66 (FIG. 1). In addition to the usual job attributes (e.g. 14 copies, long edge, two-sided, stapled . . . ), the job is associated with metadata to characterize the jobs overall and spatial sensitivity to the jet array's performance. The jet sensitivity metadata is generated by a blend of automated and manual procedures. For example, course RIP (raster image processing) algorithms could evaluate the spatial content of the color separations and store information regarding occurrences and locations of areas where weak or missing jet defects would be highly visible. In the absence of (or in addition to) a RIP evaluator, a knowledgeable operator can manually associate critical jetting areas to pages within a job.
5. Job quality requirement constraints could be handled on a job-by-job basis using the job attribute distiller 66. A subjective index rating could be provided with examples of various defects associated with a rubric (possibly multi-dimensional). The operator selects the threshold for image quality for each job. Alternatively, the operator may wish to set a global standard for the machine. This could be implemented either as a default job attribute, or as a system operational constraint.
6. An error message or an operator alert is generated by the scheduler whenever a job or an image cannot be scheduled because of a lack of machine. The operator is alerted when the jet performance is not capable of producing a document to the designated quality. The operator will then be presented with more information and options as described below.
7. A simulated defect previewer is provided to help an operator select a response to a jetting shortfall alert. The operator could tab through print preview examples of the actual page image(s) in question or of canned images that have been modified to emulate the jet performance. With the additional information, operators may opt to dismiss the alert, or intervene for maintenance between jobs in the queue, or to postpone the job in question until after a more convenient time. In other words, operators are given tools to support an intervention-by-choice strategy that matches their needs.
8. A GUI 50 to facilitate intervention-by-choice decisions not only provides the simulated defect previewer described above, it also has additional views to help the operator understand interactions between the jet performance, the job/sheet queue and the remaining web supply. An example "dashboard" helping to show these interactions is shown in FIG. 3 and is explained in more detail below. The GUI also interactively prompts the operator for choices and display the updated dashboard when implementing intervention strategies.
9. Job re-queuing for exception handling is another capability that comes into play when the status of the jets changes to below threshold performance for pages or jobs that already have confirmed schedules. The operator may be able to respond to these instances using all the same procedures as for jobs and pages that are in the process of being scheduled, the only difference being the implications and logistics for the scheduler. The critical cases are when the jetting capability threshold is lost during the course of the job or for a job that will start printing before an operator has a chance to respond. For these cases, operators may want to set either a job-by-job or global preference to (a) immediately stop the web and wait for operator instructions, or (b) continue to print while the operator decides on the next course of action, but stop before the first questionable page is printed, or (c) continue to print even questionable pages while waiting for instruction. System awareness of when a jetting failure occurred will aid in more graceful implementing job recovery when necessary.

10. Automated or semi-automated job queuing optimization could also be implemented were job image content and quality thresholds are analyzed with respect to the predicted roll changeover points and jobs requiring the best jet performance are scheduled toward the beginning of a new web roll or whenever jet failures have been cleared, such that the likelihood of a jetting shortfall is low.

With particular reference to FIG. 3, a jet array dashboard 91 as may be displayed on the GUI 50 is illustrated. The dashboard is a job and jet profile monitor which facilitates effective communication of image requirements of jobs in the system queue with detected machine capabilities. More particularly, the schedule of job profiles is identified by the current job 92, already executed jobs 94, and to be executed jobs 96. Other characteristic job data includes the job length (i.e., number of prints) 98, the prints on a web roll after completion of a job 100, and a quality target 102 comprising a relative representation of the desired and acceptability of job quality where "5" represents a very high quality print job and "1" represents a relatively low quality print job. Columns 106, 108, 110 and 112 are spatial representations of job color requirements corresponding to printhead spatial positions. Again, the illustrated embodiments are merely exemplary wherein column 106 represents the cyan requirements, column 108 represents the magenta requirements, column 110 represents the yellow requirements and column 112 represents the black requirements for distinct print jobs per color per jet. A relatively high color demand in a particular spatial location is represented by a higher block curve, e.g. the cyan requirement 116 in current job +3 or the magenta requirement 118 in the current job. Accordingly, an operator upon viewing the dashboard 91 can easily determine where increased color requirements exist spatially within the print job. Vertical lines 120 shown in the dashboard 91 indicate where particular jets have failed within printheads. It can be seen within the current job 92 that the 4 cyan jets have failed and 1 magenta jet, 2 yellow jets and 1 black jet have also failed. The relative position of the jet failure is shown with respect to the jet spatial demand per color per job and thus communicates to the operator a relationship between the representing of the printhead spatial demand per color per jet per job and the ink jet failure for a scheduled printed job. Dashed boxes 122, 126 indicate graphically the likelihood of an unacceptable job print quality as a result of the failed ink jets 120 relative to the job quality target 102 and the spatial demand for ink jet performance thereto. As can be seen in current job +2, there is a relatively high demand for cyan in combination with a relatively high quality target, "4", so that the three ink jet failures 120 in the cyan printheads will result in an unacceptable job. Similarly, current job +2 also suffers from yellow printhead failure 126 with a relatively high yellow requirement and the same quality target. Dashboard 91 thus easily and graphically represents to the operator an imminent job which will effectively fail to meet its quality requirements based on current system performance. The operator will reschedule current job +2 for a time when corrective maintenance has been accomplished for the ink jet failures 120 in both cyan and yellow. Alternatively, it can be seen that ink jet failures in magenta and black occur at spatial locations where no scheduled job has a relatively high requirement therefor, or that the quality target for the job is relatively low. Accordingly, even though current job +1 has a modest requirement for black at a location where an ink jet failure has occurred, it is seen that the job will be acceptable despite the ink jet failure and may proceed without rescheduling. If current job +2 were rescheduled for a later time, then the order of print jobs will be changed so that immediately after current job +1 is executed, current job +3 would be executed.

Areas 122 and 126 may be identified by predetermined standards for the unacceptable job print quality which, when detected, the rescheduling may occur automatically without human operator intervention as an alternative embodiment of the subject methods.

Figure 4:
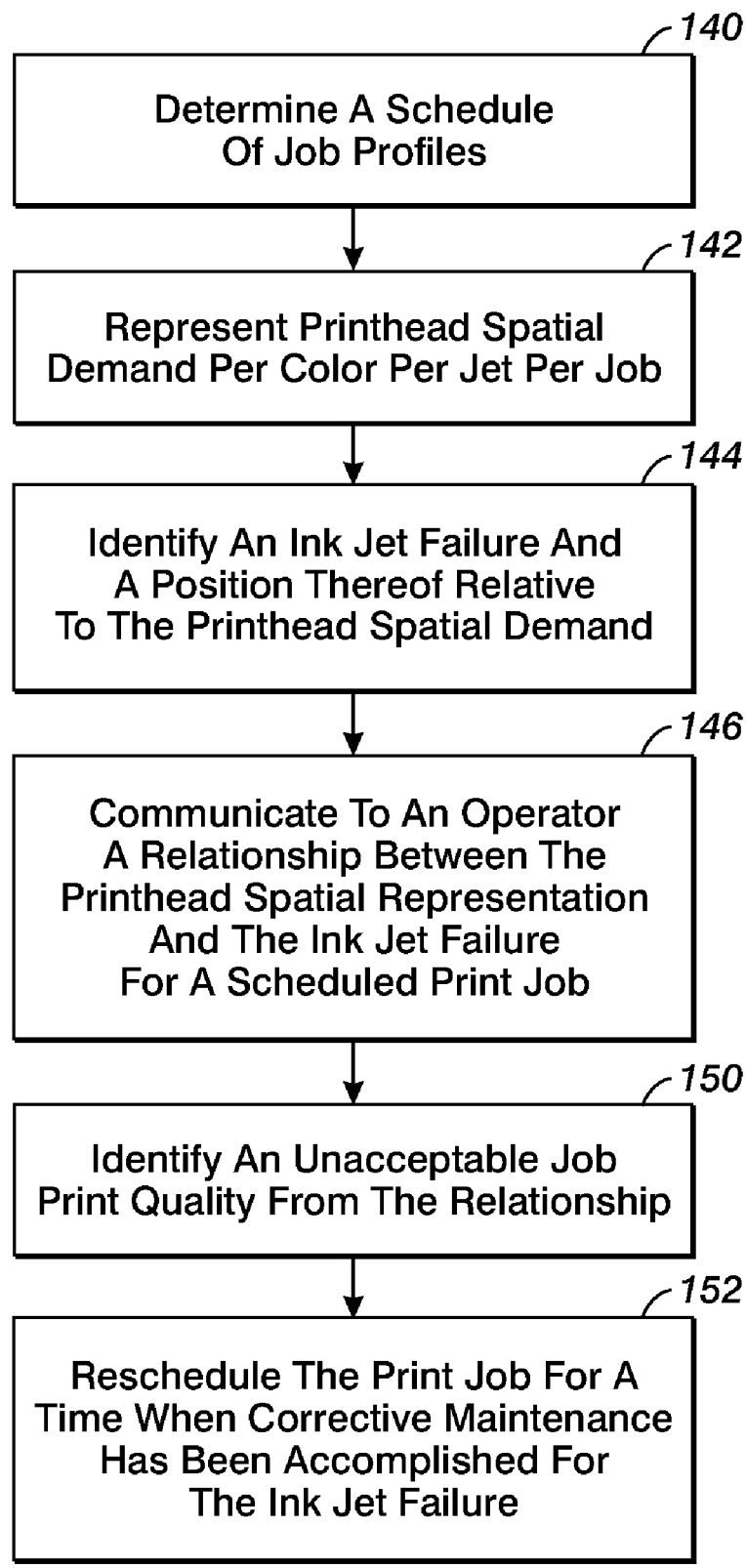
FIG. 4 comprises a flowchart of a variable fault tolerance method supporting an intervention-by-choice strategy for a production piezo ink jet architecture.

With particular reference to FIG. 4, a flowchart representation of one embodiment employed within an ink jet printing system including variable fault tolerance to support intervention-by-choice job scheduling and maintenance intervention is shown. The system includes a modular printhead assembly disposed within the printing system for on-line printing operation. The mark facility controller 52 determines 140 a schedule of job profiles and represents 142 printhead spatial demand per color per jet per job. A jetting performance monitor function identifies 144 an ink jet failure and a position thereof relative to the printhead spatial demand. A user interface 50 communicates 146 a relationship between the printhead spatial representation of demand and the ink jet failure. The relationship can identify 150 an unacceptable job print quality so that the print job can be manually or automatically rescheduled 152 for a time when corrective maintenance has been accomplished for the ink jet failure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for scheduling print jobs and printhead maintenance in an ink jet printing system in response to printhead jetting failure, comprising:
   representing a printhead spatial demand per color per jet per job;
   identifying an ink jet failure by using an image-on-web sensor to measure ejected ink droplets and determining a position of the ink jet failure relative to the printhead spatial demand;
   communicating to an operator a relationship between the printhead spatial demand and the ink jet failure for a scheduled print job;
   identifying an unacceptable job print quality from the relationship; and,
   rescheduling the print job for a time when corrective maintenance has been accomplished for the ink jet failure.

2. The method of claim 1 wherein the rescheduling includes changing the order of print jobs to execute selected print jobs having communicated relationships of acceptable job print quality prior to the corrective maintenance.

3. The method of claim 1 wherein the communicating includes displaying a graphical representation of currently scheduled job demands and ink jet profiles.

4. The method of claim 3 wherein the displaying is to a human operator.

5. The method of claim 1 wherein identifying the unacceptable print job quality is determined by predetermined standards for the unacceptable job print quality.

6. The method of claim 3 wherein the graphical representation comprises a likely impact of ink jet performance on future scheduled print jobs.

7. An intervention-by-choice printhead maintenance method in an ink jet printing system, comprising:
compiling profile representations of scheduled print jobs representative of ink jet demand per color per jet per job;
detecting an ink jet failure and location thereof using an image-on-web sensor to measure ejected ink droplets on a web;
communicating to an operator a relationship between the compiled profile representations of scheduled print jobs and the ink jet failure for a scheduled job;
rescheduling print jobs for enhancing system performance efficiency by re-queuing selected jobs which can be executed with the detected ink jet failure while satisfying the job specific print quality requirement before a system repair intervention.

8. The method of claim 7 wherein the rescheduling includes re-queuing other selected jobs which cannot be executed with the detected ink jet failure while satisfying the job specific print quality requirement before a system repair intervention.

9. The method of claim 8 wherein the maintenance intervening is executed after completion of the rescheduled selected print jobs and before executing the other selected jobs which are unable to be executed while satisfying the job specific print quality requirement with the detected ink jet failure.

10. The method of claim 7 further including maintenance intervening within the scheduled print jobs for repair of the detected ink jet failure.

11. The method of claim 7 wherein the assessing includes considering at least one enabling element comprising:
sheet and/or job scheduling based on a model of the machine;
jet performance monitoring;
web usage tracking;
print job image characterization (automatic or manual);
job quality requirement constraints;
error messages and operator alerts;
simulated effect previewing;
a GUI to facilitate intervention by choice decisions;
job re-queuing for exception handling; or
automated or semi-automated job queuing optimization.

12. An ink jet printing system including variable fault tolerance to support intervention-by-choice job scheduling and maintenance intervention, comprising:
a modular printhead assembly disposed within the printing system for on-line printing operation;
a jetting performance monitor function using an image-on-web sensor local controller to detect the location of printhead alignment errors, malfunctioning jets, and ink jet failures by measuring the ejected ink droplets on the web;
a scheduler for compiling a print job queue and corresponding job profiles including a representation of printhead spatial demand per color per jet per job;
a user interface for communicating a relationship between the representation of the printhead spatial demand and the detected location of printhead alignment errors, malfunctioning jets, and ink jet failures; and,
a rescheduler for reorganizing the job queue when the relationship corresponds to a scheduled job having an unacceptable job print quality wherein the scheduled job is delayed until after completion of the maintenance intervention.

13. The system of claim 12 wherein the interface comprises a user interface to a human operator.

14. The system of claim 12 wherein the interface comprises an input to a controller having predetermined standards for the unacceptable job print quality.

15. The system of claim 12 wherein the unacceptable job print quality comprises an assessment of a job enabling element including at least one element from an element group comprising:
sheet and/or job scheduling based on a model of the machine;
jet performance monitoring;
web usage tracking;
job image characterization (automatic or manual print);
job quality requirement constraints;
error messages and operator alerts;
simulated effect previewing;
a GUI to facilitate intervention by choice decisions;
job re-queuing for exception handling; or
automated or semi-automated job queuing optimization.

* * * * *